US011137909B2

United States Patent
Puppin

(10) Patent No.: US 11,137,909 B2
(45) Date of Patent: *Oct. 5, 2021

(54) SECURE DATA ENTRY VIA A VIRTUAL KEYBOARD

(71) Applicant: Google LLC, Mountain View, CA (US)

(72) Inventor: Diego Puppin, Arlington, MA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/134,076

(22) Filed: Dec. 24, 2020

(65) Prior Publication Data

US 2021/0117082 A1 Apr. 22, 2021

Related U.S. Application Data

(63) Continuation of application No. 15/967,325, filed on Apr. 30, 2018, now Pat. No. 10,908,814, which is a
(Continued)

(51) Int. Cl.
*G06F 3/0488* (2013.01)
*G06F 21/36* (2013.01)
(Continued)

(52) U.S. Cl.
CPC ........ *G06F 3/04886* (2013.01); *G06F 3/0236* (2013.01); *G06F 3/0238* (2013.01);
(Continued)

(58) Field of Classification Search
CPC .................................................. G06F 3/04886
See application file for complete search history.

(56) References Cited

U.S. PATENT DOCUMENTS

| | | | |
|---|---|---|---|
| 5,949,348 A * | 9/1999 | Kapp | G06F 21/83 340/5.4 |
| 6,011,544 A | 1/2000 | Sato | |

(Continued)

FOREIGN PATENT DOCUMENTS

WO 2011/051757 5/2011

OTHER PUBLICATIONS

CNET staff, "Geeting to know your Mac: Keychain Access," retrieved from https://www.cnet.com/news/getting-to-know-yourmac-keychain-access/, Sep. 2, 2009, 3 pages.
(Continued)

*Primary Examiner* — Daniel Rodriguez
(74) *Attorney, Agent, or Firm* — McDonnell Boehnen Hulbert & Berghoff LLP

(57) ABSTRACT

A communication device, which is capable of presenting one or more of a plurality of virtual keyboards, may be operable to receive application content. The application content may require a user to enter particular data via one of the plurality of virtual keyboards. The plurality of virtual keyboards may comprise a system keyboard and one or more third-party keyboards. The communication device may be operable to determine whether the particular data to be entered by the user may comprise sensitive personal information associated with the user. Based on the determination of the personal information and/or based on a configuration option communicated from the user, the communication device may be operable to determine whether to cause presentation of the system keyboard for the user to enter the particular data. The communication device may cause presentation of the system keyboard by disabling the one or more third-party keyboards.

20 Claims, 4 Drawing Sheets

Related U.S. Application Data continuation of application No. 14/280,249, filed on May 16, 2014, now Pat. No. 9,983,787, which is a continuation of application No. 13/529,375, filed on Jun. 21, 2012, now Pat. No. 8,762,876.

(51) Int. Cl.
　　*G06F 21/83* （2013.01）
　　*G06F 3/023* （2006.01）
　　*G06F 3/0481* （2013.01）
(52) U.S. Cl.
　　CPC ........ *G06F 3/0481* (2013.01); *G06F 3/04883* (2013.01); *G06F 21/36* (2013.01); *G06F 21/83* (2013.01)

(56) References Cited

U.S. PATENT DOCUMENTS

| Patent/Pub. No. | Date | Inventor | Class |
|---|---|---|---|
| 6,484,261 B1* | 11/2002 | Wiegel | H04L 41/0856 715/763 |
| 6,662,020 B1* | 12/2003 | Aaro | G06Q 20/32 455/411 |
| 7,669,218 B1* | 2/2010 | Groff | H04N 7/17327 725/50 |
| 7,705,829 B1* | 4/2010 | Plotnikov | G06F 21/83 345/168 |
| 7,761,794 B1* | 7/2010 | Chari | G06Q 10/06 715/700 |
| 8,176,324 B1* | 5/2012 | Krishnamurthy | G06F 3/04812 713/168 |
| 8,220,047 B1* | 7/2012 | Soghoian | H04L 51/14 726/22 |
| 8,561,127 B1* | 10/2013 | Agrawal | H04L 63/105 726/1 |
| 8,577,846 B1* | 11/2013 | Axe | G06F 40/174 707/654 |
| 8,762,876 B2 | 6/2014 | Puppin | |
| 8,856,869 B1* | 10/2014 | Brinskelle | G06F 21/6218 726/2 |
| 2003/0097373 A1* | 5/2003 | Yamada | G06F 9/445 |
| 2003/0167405 A1* | 9/2003 | Freund | H04L 63/20 726/12 |
| 2003/0177389 A1* | 9/2003 | Albert | H04L 63/0263 726/1 |
| 2003/0204748 A1* | 10/2003 | Chiu | H04W 12/033 726/3 |
| 2004/0059590 A1* | 3/2004 | Mercredi | G06F 21/41 726/5 |
| 2004/0183834 A1* | 9/2004 | Chermesino | G06F 3/04886 715/773 |
| 2005/0021668 A1* | 1/2005 | Beesley | H04L 67/34 709/217 |
| 2005/0066186 A1* | 3/2005 | Gentle | G06F 21/83 713/193 |
| 2005/0212763 A1* | 9/2005 | Okamura | G06F 3/04886 345/156 |
| 2005/0251752 A1* | 11/2005 | Tan | G07F 7/10 715/741 |
| 2007/0089164 A1* | 4/2007 | Gao | G06F 3/04886 726/4 |
| 2007/0192596 A1* | 8/2007 | Otsuka | H04L 63/20 713/166 |
| 2007/0255840 A1* | 11/2007 | Jones | H04L 63/162 709/229 |
| 2007/0282974 A1* | 12/2007 | Nagoshi | H04N 1/00472 709/217 |
| 2008/0036739 A1 | 2/2008 | Juh et al. | |
| 2008/0104507 A1* | 5/2008 | Nurmi | G06F 16/954 715/255 |
| 2008/0115078 A1* | 5/2008 | Girgaonkar | G06F 3/04886 715/773 |
| 2008/0132286 A1* | 6/2008 | Sohn | H04M 1/0241 455/566 |
| 2008/0148186 A1* | 6/2008 | Krishnamurthy | G06F 21/36 715/840 |
| 2008/0288776 A1* | 11/2008 | Kim | H04L 9/0822 713/168 |
| 2008/0289047 A1* | 11/2008 | Benea | H04L 63/1483 726/27 |
| 2009/0077383 A1* | 3/2009 | de Monseignat | H04L 63/0823 713/175 |
| 2009/0106827 A1* | 4/2009 | Cerruti | G06F 21/83 726/7 |
| 2010/0064375 A1* | 3/2010 | Gorczowski | G06F 3/0484 726/28 |
| 2010/0070437 A1* | 3/2010 | Sickenius | G06F 21/84 706/12 |
| 2010/0186070 A1* | 7/2010 | McAlear | G06F 21/83 726/5 |
| 2010/0223358 A1* | 9/2010 | Schneider | H04L 63/0884 709/219 |
| 2010/0259561 A1 | 10/2010 | Forutanpour et al. | |
| 2011/0078614 A1 | 3/2011 | Lee et al. | |
| 2011/0109567 A1* | 5/2011 | Kim | G06F 3/0416 345/173 |
| 2011/0181522 A1* | 7/2011 | Rendahl | G06F 3/04886 345/173 |
| 2011/0208866 A1* | 8/2011 | Marmolejo-Meillon | H04L 67/04 709/227 |
| 2011/0254773 A1* | 10/2011 | Minari | G06F 3/0238 345/168 |
| 2011/0265145 A1* | 10/2011 | Prasad | H04L 65/1079 726/3 |
| 2011/0288965 A1* | 11/2011 | Lazarro | G07F 7/10 705/27.1 |
| 2011/0302518 A1* | 12/2011 | Zhang | G06F 3/0234 715/773 |
| 2012/0047564 A1* | 2/2012 | Liu | G06Q 20/385 726/6 |
| 2012/0144281 A1* | 6/2012 | Schechter | G06F 16/2438 715/205 |
| 2012/0159612 A1* | 6/2012 | Reisgies | G06F 21/41 726/18 |
| 2012/0173426 A1* | 7/2012 | Foster | G06Q 20/322 705/44 |
| 2012/0184299 A1* | 7/2012 | Loveland | G05B 15/02 455/456.3 |
| 2012/0191575 A1* | 7/2012 | Vilke | G06Q 30/0641 705/27.1 |
| 2012/0216047 A1* | 8/2012 | Yu | G06F 21/31 713/185 |
| 2012/0239640 A1* | 9/2012 | Vaananen | G06Q 30/0619 707/711 |
| 2012/0266220 A1* | 10/2012 | Brudnicki | G06F 21/629 726/6 |
| 2013/0036467 A1* | 2/2013 | Krummel | G06F 21/57 726/22 |
| 2013/0091583 A1* | 4/2013 | Karroumi | G06F 3/04886 726/26 |
| 2013/0145475 A1* | 6/2013 | Ryu | G06F 21/31 726/26 |
| 2013/0263039 A1* | 10/2013 | Fahlgren | G06F 3/0238 715/780 |
| 2014/0096201 A1* | 4/2014 | Gupta | G06F 21/83 726/4 |
| 2014/0101595 A1* | 4/2014 | Kumara | G06F 3/04886 715/773 |
| 2014/0304649 A1* | 10/2014 | Phegade | G06F 21/84 715/809 |

OTHER PUBLICATIONS

European Patent Office, Extended European Search Report for EP 13003090.1, dated Oct. 9, 2013.

"Keyboard Manager Automatically Sets Your Android Keyboard Based on Screen Orientation," downloaded May 27, 2012, 3 pages.

Neela, Pradeep, "How to Select Input Method or Change Android

(56) References Cited

OTHER PUBLICATIONS

Keyboards," retrieved from http://androidadvices.com/how-to-select-input-method-or-change-android-keyboards, Feb. 14, 2011, 3 pages.
PlazaLogic, "eyesboard Features," 2008, http://www.plazalogic.com/en-US/product/eyesboard/features.html, 1 page.
Sato, Tom, "xvkbd—virtual keyboard for X window system," http://homepage3.nifty.com/tsata/xvkbd/, Mar. 2012, 20 pages.
Zukerman, Erez, "How to change Android keyboards or input methods," downloaded on May 27, 2012 from dowr.ioadsquad.sw!tched.comiZO•i1/0•IJ25ihow-to-change-android-keyboards-or-input-roethods/, Jan. 25, 2011, 6 pages.

\* cited by examiner

SECURE DATA ENTRY VIA A VIRTUAL KEYBOARD

CROSS-REFERENCE TO RELATED APPLICATIONS

This present application is a continuation of U.S. patent application Ser. No. 15/967,325 filed on Apr. 30, 2018, which is a continuation of U.S. patent application Ser. No. 14/280,249 filed on May 16, 2014, which is a continuation of U.S. patent application Ser. No. 13/529,375 filed on Jun. 21, 2012, the content of which is herewith incorporated by reference.

FIELD

Certain embodiments of the disclosure relate to secure data entry. More specifically, certain embodiments of the disclosure relate to a method and system for secure data entry via a virtual keyboard.

BACKGROUND

A communication device may be capable of presenting or displaying a virtual keyboard for a user to enter data or information. The communication device may comprise, for example, a mobile phone, a smart phone, a tablet, a laptop, and/or other touchscreen-enabled devices. A virtual keyboard is a software component that allows a user to enter characters. A virtual keyboard may be commonly used as an on-screen input method in the communication device. A virtual keyboard may be a system keyboard native to the communication device. The system keyboard may be installed by a manufacturer of the communication device. A virtual keyboard may also be a third-party keyboard. One or more third-party keyboards may be installed and enabled for third-party applications running on the communication device. A third-party keyboard, when enabled, may have access to every single keystroke and may possibly have access to sensitive personal information such as, for example, passwords or credit card numbers, associated with the user of the communication device.

Further limitations and disadvantages of conventional and traditional approaches will become apparent to one of skill in the art, through comparison of such systems with the present disclosure as set forth in the remainder of the present application with reference to the drawings.

SUMMARY

Aspects of the present disclosure are directed to a method and system for secure data entry via a virtual keyboard. In various embodiments of the disclosure, a communication device, which is capable of presenting one or more of a plurality of virtual keyboards, may be operable to receive application content. The application content may require a user to enter particular data via one of the plurality of virtual keyboards. In this regard, the plurality of virtual keyboards may comprise a system keyboard and one or more third-party keyboards. The communication device may be operable to determine whether the particular data to be entered by the user may comprise sensitive personal information associated with the user. Based on the determination of the personal information and/or based on a configuration option communicated from the user, the communication device may then be operable to determine whether to cause presentation of the system keyboard for the user to enter the particular data. In such instances, the communication device may be operable to cause presentation of the system keyboard by disabling the one or more third-party keyboards.

Various advantages, aspects and novel features of the present disclosure, as well as details of an illustrated embodiment thereof, will be more fully understood from the following description and drawings.

DETAILED DESCRIPTION

Figure 1:
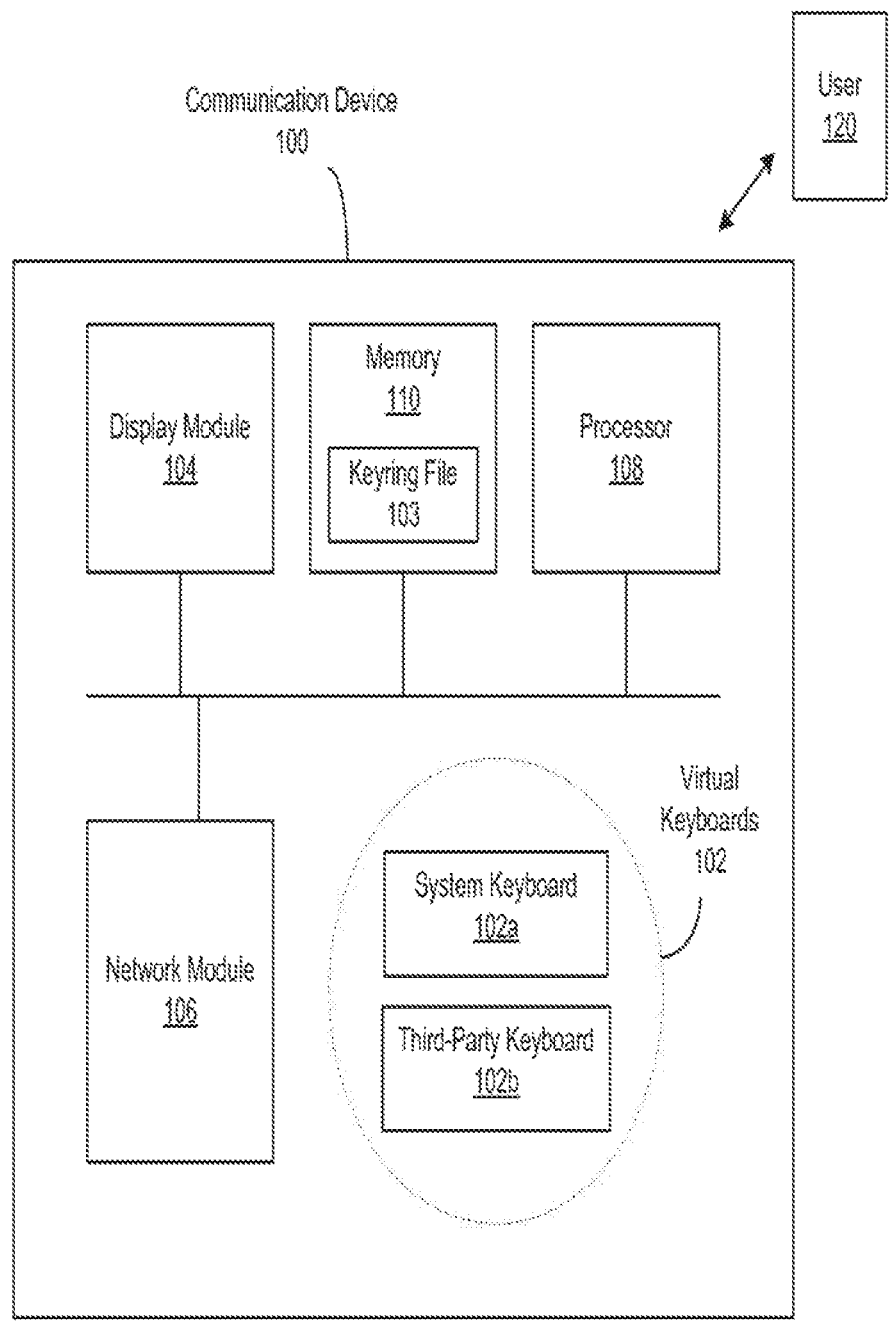
FIG. 1 is a block diagram illustrating an example communication device, in accordance with an embodiment of the disclosure.

Certain embodiments of the disclosure can be found in a method and system for secure data entry via a virtual keyboard. Certain specific details are set forth in the following description and in drawings to provide a thorough understanding of various embodiments of the disclosure. One skilled in the art, however, will understand that additional embodiments of the present disclosure may be practiced without several of the details described in the following description.

In various embodiments of the disclosure, a communication device, which is capable of presenting one or more of a plurality of virtual keyboards, may be operable to receive application content, and the application content may require a user to enter particular data via one of the plurality of virtual keyboards. In this regard, the plurality of virtual keyboards may comprise a system keyboard and one or more third-party keyboards. The communication device may be operable to determine whether the particular data to be entered by the user may comprise sensitive personal information associated with the user. Based on the determination of the personal information and/or based on a configuration option communicated from the user, the communication device may be operable to determine whether to cause presentation of the system keyboard for the user to enter the particular data. In such instances, the communication device may be operable to cause presentation of the system keyboard by disabling the one or more third-party keyboards.

In an example embodiment of the disclosure, the particular data may be determined to comprise the personal information based on one or more keywords and/or one or more images in the application content, where the one or more keywords and the one or more images are associated with the sensitive personal information. In this regard, the one or more keywords may comprise, for example, password, login, payment, credit card, number, expiration and/or a name of a particular credit card. The particular data may be determined to comprise the personal information based on previously stored keyboard information associated with the application content. The particular data may also be determined to comprise the personal information based on detection of one or more secure communication protocols used by the application content.

In an example embodiment of the disclosure, in instances when the particular data are determined to comprise the personal information and the user determines that the determination of the personal information is incorrect, the communication device may be operable to re-present a particular third-party keyboard associated with the application content, based on indication of the particular third-party keyboard communicated from the user, for the user to enter the particular data. The communication device may then be operable to store keyboard information on the particular third-party keyboard associated with the application content. In instances when receiving the application content in a next time, the communication device may then be operable to determine whether the particular data to be entered by the user may comprise the personal information, based on the stored keyboard information associated with the application content.

In another example embodiment of the disclosure, the received application content may comprise a webpage. In such instances, the communication device may be operable to determine that the webpage may require the user to enter sensitive password information, based on a hypertext markup language (HTML) tag with a name password in the webpage. In instances when the particular data may comprise sensitive password information, the communication device may be operable to store, in a keyring file, the password information entered by the user via the system keyboard. In this regard, in instances when receiving the application content in a next time, the communication device may be operable to request the password information from the keyring file without requiring the user to enter the password information via one of the plurality of virtual keyboards, and without causing presentation of the system keyboard.

FIG. 1 is a block diagram illustrating an example communication device, in accordance with an embodiment of the disclosure. Referring to FIG. 1, there is shown a communication device 100 and a user 120. The communication device 100 may be, for example, a mobile phone, a smart phone, a tablet, a laptop and/or other touchscreen-enabled communication devices. The communication device 100 may comprise a processor 108, a memory 110, a display module 104 and a network module 106. The communication device 100 may also comprise a plurality of virtual keyboards 102. The plurality of virtual keyboards 102 may comprise a system keyboard 102a and one or more third-party keyboards, of which a third-keyboard 102b is illustrated.

The processor 108 may comprise suitable logic, circuitry, interfaces and/or code that may be operable to manage and/or control operations of various components in the communication device 100 such as, for example, the display module 104, the network module 106 and/or other hardware components. The processor 108 may utilize an operating system that enables the execution of various applications.

In an example embodiment of the disclosure, the processor 108 in the may be operable to receive application content via the network module 106. The received application content may require a user such as the user 120 to enter particular data via one of the plurality of virtual keyboards 102. For example, the application content may require the user 120 to enter a login name and a password. The application content may require the user 120 to fill up a form, for example. In such instances, the processor 108 may be operable to determine whether the particular data to be entered by the user 120 may comprise sensitive personal information associated with the user 120. Based on the determination of the personal information and/or based on a configuration option communicated from the user 120, the processor 108 may be operable to determine whether to cause presentation of the system keyboard 102a on the display module 104 for the user 120 to enter the particular data. In this regard, for example, in instances when the particular data is determined to comprise the sensitive personal information, the processor 108 may be operable to cause presentation of the system keyboard 102a by disabling the one or more third-party keyboards such as the third-party keyboard 102b. However, the user 120 may be offered a configuration option to disable or enable this behavior of the processor 108. Therefore, the processor 108 may be operable to also determine whether to cause presentation of the system keyboard 102a on the display module 10, based on a configuration option communicated from the user 120.

The memory 110 may comprise suitable logic, circuitry, interfaces and/or code that may be operable to store information such as executable instructions and/or data that may be utilized by the processor 108. The memory 110 may comprise RAM, ROM, low latency nonvolatile memory such as flash memory and/or other suitable electronic data storage. In an example embodiment of the disclosure, the memory 110 may comprise a keyring file 103. The keyring file 103 may store sensitive personal information or data such as, for example, user login names and/or passwords. In the keyring file 103, the sensitive personal data are encrypted.

The display module 104 may comprise suitable logic, circuitry, interfaces and/or code that may be operable to display or present processed content to a user such as the user 120 of the communication device 100. In an example embodiment of the disclosure, the display module 104 may be capable of presenting one or more of the virtual keyboards 102. The display module 104 may present application content which may require the user 120 to enter data via one of the virtual keyboards 102.

The network module 106 may comprise suitable logic, circuitry, interfaces and/or code that may be operable to support one or more communication protocols such as wireless protocols and/or wire-line protocols. The communication device 100 may receive application content via the network module 106. The communication device 100 may transmit user inputs or responses associated with the application content via the network module 106.

In operation, the display module 104 in the communication device 100 may be capable of presenting one or more of a plurality of virtual keyboards 102. The processor 108 in the communication device 100 may be operable to receive application content via the network module 106 in the communication device 100. The received application content may require a user such as the user 120 to enter particular data via one of the plurality of virtual keyboards 102. The plurality of virtual keyboards 102 may comprise a system keyboard such as the system keyboard 102a and one or more third-party keyboards such as the third-party keyboard 102b. For example, the application content may require the user 120 to enter a login name and a password. The application content may require the user 120 to fill up a form, for example. In such instances, the processor 108 may be operable to determine whether the particular data to be entered by the user 120 may comprise sensitive personal information associated with the user 120. Based on the determination of the personal information and/or based on a configuration option communicated from the user 120, the processor 108 may be operable to determine whether to cause presentation of the system keyboard 102a on the display module 104 in the communication device 100 for the user 120 to enter the particular data. In this regard, for example, in instances when the particular data is determined to comprise the sensitive personal information, the processor 108 may be operable to cause presentation of the system keyboard 102a by disabling the one or more third-party keyboards such as the third-party keyboard 102b. However, the user 120 may be offered a configuration option to disable or enable this behavior of the processor 108. Therefore, the processor 108 may be operable to also determine whether to cause presentation of the system keyboard 102a on the display module 104, based on a configuration option communicated from the user 120.

In an example embodiment of the disclosure, the processor 108 may be operable to determine whether the particular data may comprise the personal information based on one or more keywords and/or one or more images in the application content, where the one or more keywords and the one or more images are associated with the sensitive personal information. In this regard, the one or more keywords may comprise, for example, password, login, payment, credit card, number, expiration and/or a name of a particular credit card. The one or more images may comprise, for example, logos of some credit cards (e.g., VISA logo, MasterCard logo, etc.). The processor 108 may be operable to determine whether the particular data may comprise the personal information based on previously stored keyboard information associated with the application content. For example, based on previous experience with the received application content, the processor 108 may have recorded and stored, in the memory 110, information on which of the virtual keyboards 102 (e.g., the system keyboard 102a or the third-party keyboard 102b) may have been selected for entering the particular data. Based on this stored keyboard information associated with the application content, the processor 108 may determine whether the particular data may comprise the personal information. For example, in instances when the keyboard information indicates that the third-party keyboard 102b has been selected for entering the particular data, the particular data may be determined not to comprise the sensitive personal information.

The processor 108 may also be operable to determine whether the particular data may comprise the personal information based on detection of one or more secure communication protocols used by the application content. For example, a hypertext transfer protocol secure (HTTPS) may be used by the application content for handling data transfer. Based on detection of the HTTPS used by the applicant content, the particular data may be determined to comprise the sensitive personal information.

In an example embodiment of the disclosure, in instances when the particular data are determined to comprise the personal information and the user 120 determines that the determination of the personal information is incorrect, the processor 108 may be operable to re-present a particular third-party keyboard, such as the third-party keyboard 102b, associated with the application content, based on indication of the particular third-party keyboard 102b communicated from the user 120, for the user 120 to enter the particular data. The processor 108 may then be operable to store keyboard information on the particular third-party keyboard 102b associated with the application content. In instances when receiving the application content via the network module 106 in a next time, the processor 108 may then be operable to determine whether the particular data to be entered by the user 120 may comprise the personal information, based on the stored keyboard information associated with the application content.

In another example embodiment of the disclosure, the received application content may comprise a webpage. In such instances, the processor 108 may be operable to determine that the webpage may require the user 120 to enter sensitive password information, based on a hypertext markup language (HTML) tag with a name password in the webpage. In instances when the particular data may comprise sensitive password information, the processor 108 may be operable to store, in a keyring file, such as the keyring file 103 in the memory 110, the password information entered by the user 120 via the system keyboard 102a. In this regard, in instances when receiving the application content via the network module 106 in a next time, the processor 108 may be operable to request the password information from the keyring file 103 without requiring the user 120 to enter the password information via one of the plurality of virtual keyboards 102, and without causing presentation of the system keyboard 102a.

Figure 2:
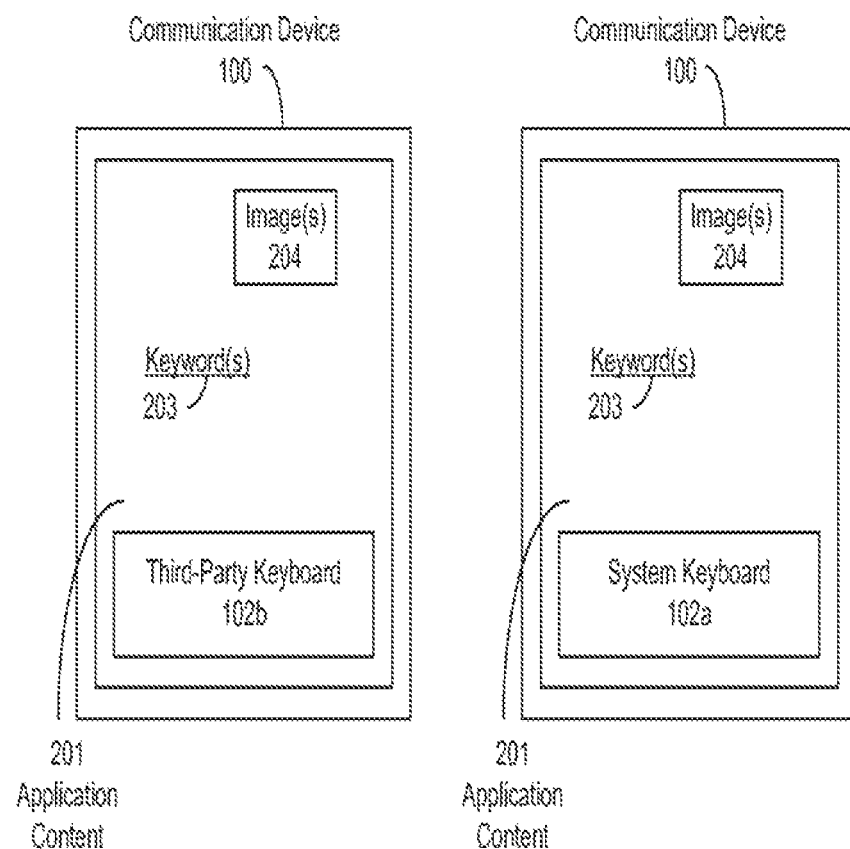
FIG. 2 is a block diagram illustrating an example secure data entry via a virtual keyboard, in accordance with an embodiment of the disclosure.

FIG. 2 is a block diagram illustrating an example secure data entry via a virtual keyboard, in accordance with an embodiment of the disclosure. Referring to FIG. 2, there is shown the communication device 100 presenting a third-party keyboard for data entry. In such instances, the communication device 100 may display the third-party keyboard 102b and received application content 201. The application content 201 may comprise one or more keywords 203 and/or one or more images 204. There is also shown the communication device 100 presenting a system keyboard for secure data entry. In such instances, the communication device 100 may display the system keyboard 102a and the application content 201. The application content 201 may comprise the one or more keywords 203 and/or the one or more images 204.

In an example operation, the processor 108 in the communication device 100 may be operable to receive the application content 201 via the network module 106 in the communication device 100. The received application content 201 may comprise one or more keywords 203 and/or one or more images 204, where the one or more keywords 203 and the one or more images 204 may be associated with sensitive personal information. The received application content 201 may require a user such as the user 120 to enter particular data via a virtual keyboard such as the third-party keyboard 102b. For example, the application content 201 may require the user 120 to enter a login name and a password. In such instances, the processor 108 may be operable to determine whether the particular data to be entered by the user 120 may comprise sensitive personal information associated with the user 120, based on, for example, the one or more keywords 204 and/or the one or more images 204 in the applicant content 201. Based on the determination of the personal information, the processor 108 may be operable to determine whether to cause presentation of the system keyboard 102a on the display module 104 in the communication device 100 for the user 120 to enter the particular data. In this regard, for example, in instances when the particular data is determined to comprise the sensitive personal information such as the login name or the password, the processor 108 may be operable to cause presentation of the system keyboard 102a by disabling the third-party keyboard 102b. The user 120 may then enter the required particular data via the system keyboard 102a.

Figure 3:
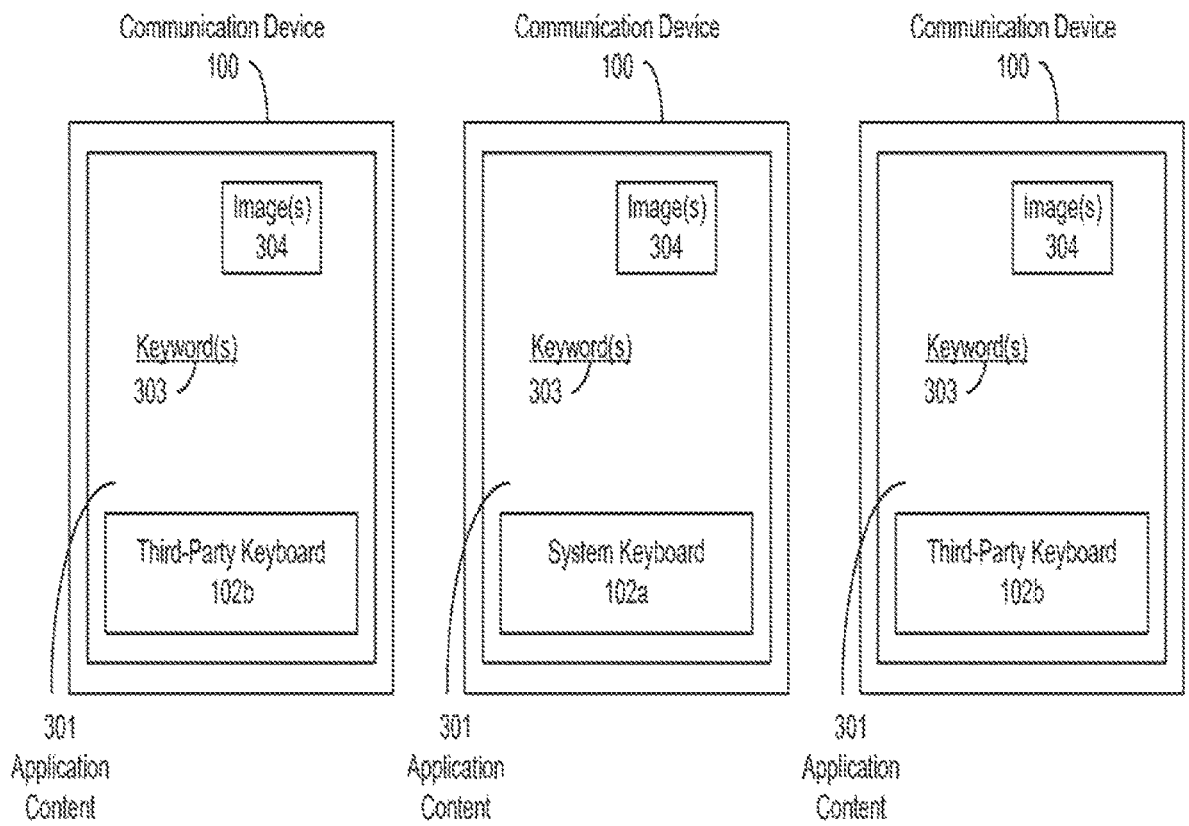
FIG. 3 is a block diagram illustrating an example scenario of data entry via a virtual keyboard, in accordance with an embodiment of the disclosure.

FIG. 3 is a block diagram illustrating an example scenario of data entry via a virtual keyboard, in accordance with an embodiment of the disclosure. Referring to FIG. 3, there is shown the communication device 100 presenting a third-party keyboard for data entry. In such instances, the communication device 100 may display the third-party keyboard 102b and received application content 301. The application content 301 may comprise one or more keywords 303 and/or one or more images 304. There is also shown the communication device 100 presenting a system keyboard for secure data entry. In such instances, the communication device 100 may display the system keyboard 102a and the application content 301. The application content 301 may comprise the one or more keywords 303 and/or the one or more images 304. There is also shown the communication device 100 presenting a third-party keyboard due to an indication from a user such as the user 120. In such instances, the communication device 100 may display the third-party keyboard 102b and the application content 301. The application content 301 may comprise the one or more keywords 303 and/or the one or more images 304.

In an example operation, the processor 108 in the communication device 100 may be operable to receive the application content 301 via the network module 106 in the communication device 100. The received application content 301 may comprise one or more keywords 303 and/or one or more images 304, where the one or more keywords 303 and the one or more images 304 may be considered to be associated with sensitive personal information. The received application content 301 may require a user such as the user 120 to enter particular data via a virtual keyboard such as the third-party keyboard 102b. For example, the application content 301 may require the user 120 to fill up a form. In such instances, the processor 108 may be operable to determine whether the particular data to be entered by the user 120 may comprise sensitive personal information associated with the user 120, based on, for example, the one or more keywords 304 and/or the one or more images 304 in the application content 301. Based on the determination of the personal information, the processor 108 may be operable to determine whether to cause presentation of the system keyboard 102a on the display module 104 in the communication device 100 for the user 120 to enter the particular data. In this regard, for example, in instances when the particular data is determined to comprise the sensitive personal information, the processor 108 may be operable to cause presentation of the system keyboard 102a by disabling the third-party keyboard 102b.

However, in instances when the user 120 determines or detects that the particular data to be entered actually does not comprise sensitive personal information, the user 120 may communicate an indication (e.g., by clicking third-party keyboard) to the communication device 100. The processor 108 may then be operable to re-present or re-display, on the display module 104, a particular third-party keyboard such as the third-party keyboard 102b associated with the application content 301, based on the indication communicated from the user 120. The user 120 may then enter the required particular data via the third-party keyboard 102b. In such instances, the processor 108 may then be operable to store keyboard information on the particular third-party keyboard 102b associated with the application content 301. In instances when receiving the application content 301 via the network module 106 in a next time, the processor 108 may then be operable to determine whether the particular data to be entered by the user 120 may comprise the personal information, based on the stored keyboard information associated with the application content 301.

Figure 4:
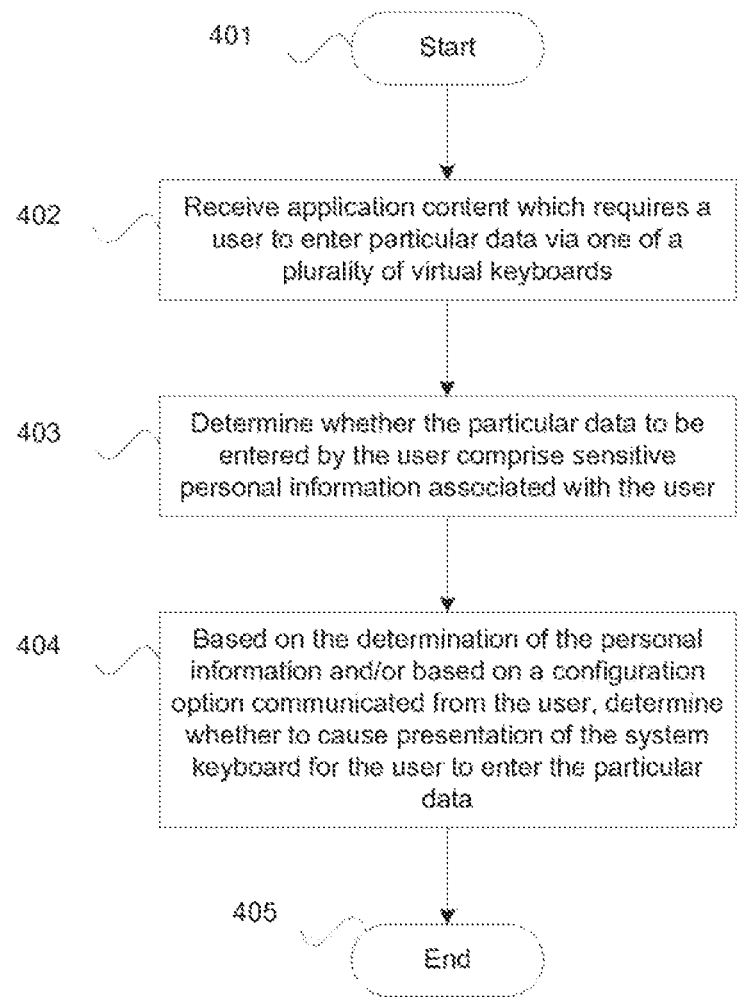
FIG. 4 is a flow chart illustrating example steps for secure data entry via a virtual keyboard, in accordance with an embodiment of the disclosure.

FIG. 4 is a flow chart illustrating example steps for secure data entry via a virtual keyboard, in accordance with an embodiment of the disclosure. Referring to FIG. 4, the example steps start at step 401. In step 402, the processor 108 in the communication device 100 may be operable to receive application content 201 which may require a user such as the user 120 to enter particular data via one of a plurality of virtual keyboards 102. The plurality of virtual keyboards 102 may comprise a system keyboard 102a and one or more third-party keyboards 102b. In step 403, the processor 108 may be operable to determine whether the particular data to be entered by the user 120 may comprise sensitive personal information or data associated with the user 120. In step 404, based on the determination of the sensitive personal information and/or based on a configuration option communicated from the user 120, the processor 108 may be operable to determine whether to cause presentation of the system keyboard 102a for the user 120 to enter the particular data. The example steps may proceed to the end step 405.

In various embodiments of the disclosure, a display module 104 in a communication device 100 may be capable of presenting one or more of a plurality of virtual keyboards 102. A processor 108 in the communication device 100 may be operable to receive application content 201 via a network module 106 in the communication device 100. The received application content 201 may require a user such as the user 120 to enter particular data via one of the plurality of virtual keyboards 102. The plurality of virtual keyboards 102 may comprise a system keyboard such as the system keyboard 102a and one or more third-party keyboards such as the third-party keyboard 102b. In such instances, the processor 108 may be operable to determine whether the particular data to be entered by the user 120 may comprise sensitive personal information associated with the user 120. Based on the determination of the personal information and/or based on a configuration option communicated from the user 120, the processor 108 may be operable to determine whether to cause presentation of the system keyboard 102a on the display module 104 in the communication device 100 for the user 120 to enter the particular data. In this regard, for example, in instances when the particular data is determined to comprise the sensitive personal information, the processor 108 may be operable to cause presentation of the system keyboard 102a by disabling the one or more third-party keyboards such as the third-party keyboard 102b. However, the user 120 may be offered a configuration option to disable or enable this behavior of the processor 108. Therefore, the processor 108 may be operable to also determine whether to cause presentation of the system keyboard 102a on the display module 104, based on a configuration option communicated from the user 120.

In an example embodiment of the disclosure, the processor 108 may be operable to determine whether the particular data may comprise the personal information based on one or more keywords 203 and/or one or more images 204 in the application content 201, where the one or more keywords 203 and the one or more images 204 are associated with the sensitive personal information. In this regard, the one or more keywords 203 may comprise, for example, password, login, payment, credit card, number, expiration and/or a name of a particular credit card. The one or more images 204 may comprise, for example, logos of some credit cards. The processor 108 may be operable to determine whether the particular data may comprise the personal information based on previously stored keyboard information associated with the application content 201. The processor 108 may also be operable to determine whether the particular data may comprise the personal information based on detection of one or more secure communication protocols used by the application content 201.

In an example embodiment of the disclosure, in instances when the particular data are determined to comprise the personal information and the user 120 determines that the determination of the personal information is incorrect, the processor 108 may be operable to re-present a particular third-party keyboard, such as the third-party keyboard 102*b*, associated with the application content 301, based on indication of the particular third-party keyboard 102*b* communicated from the user 120, for the user 120 to enter the particular data. The processor 108 may then be operable to store keyboard information on the particular third-party keyboard 102*b* associated with the application content 301. In instances when receiving the application content 301 via the network module 106 in a next time, the processor 108 may then be operable to determine whether the particular data to be entered by the user 120 may comprise the personal information, based on the stored keyboard information associated with the application content 301.

In another example embodiment of the disclosure, the received application content 201 may comprise a webpage. In such instances, the processor 108 may be operable to determine that the webpage may require the user 120 to enter sensitive password information, based on a hypertext markup language (HTML) tag with a name password in the webpage. In instances when the particular data may comprise sensitive password information, the processor 108 may be operable to store, in a keyring file, such as the keyring file 103 in the memory 110, the password information entered by the user 120 via the system keyboard 102*a*. In this regard, in instances when receiving the application content 201 via the network module 106 in a next time, the processor 108 may be operable to request the password information from the keyring file 103 without requiring the user 120 to enter the password information via one of the plurality of virtual keyboards 102, and without causing presentation of the system keyboard 102*a*.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for secure data entry via a virtual keyboard.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A computer-implemented method comprising:
    making a first automated determination that a first portion of data to be entered at a computing device will comprise sensitive personal information;
    based on the first automated determination that the first portion of the data to be entered will comprise sensitive personal information, disabling a virtual third-party keyboard and instead providing a virtual system keyboard for entry of the first portion of the data, wherein the virtual system keyboard is native to the computing device;
    making a second automated determination that a second portion of the data to be entered will not comprise sensitive personal information;
    receiving a user-communicated indication to provide the virtual system keyboard for entry of the second portion of the data, wherein the user-communicated indication overrides the second automated determination that the second portion of the data to be entered will not comprise sensitive personal information; and
    disabling the virtual third-party keyboard and instead providing the virtual system keyboard for entry of the second portion of the data after receiving the user-communicated indication.

2. The computer-implemented method of claim 1, further comprising:
    storing, for application content, information representative of the user-communicated indication to provide the virtual system keyboard for entry of the second portion of the data that overrides the second automated determination; and
    when the application content is next received, determining whether entry of data comprises sensitive personal information based on the stored information representative of the user-communicated indication to provide the virtual system keyboard for entry of the second portion of the data.

3. The computer-implemented method of claim 1, wherein the virtual system keyboard is installed by a manufacturer of the computing device, and wherein the virtual third-party keyboard is provided by a third party different from the manufacturer.

4. The computer-implemented method of claim 1, wherein the virtual third-party keyboard is associated with application content, and wherein the virtual system keyboard is not associated with the application content.

5. The computer-implemented method of claim 1, wherein the first automated determination that the first portion of the data will comprise sensitive personal information is based on a keyword in application content, wherein the keyword is associated with the sensitive personal information.

6. The computer-implemented method of claim 5, wherein the keyword comprises a password, login, payment, credit card, number, expiration date, or a name of a particular credit card.

7. The computer-implemented method of claim 1, wherein the first automated determination that the first portion of the data will comprise sensitive personal information is based on an image in application content, wherein the image is associated with the sensitive personal information.

8. The computer-implemented method of claim 1, wherein the first automated determination that the first portion of the data will comprise personal information is based on previously stored keyboard information associated with application content.

9. The computer-implemented method of claim 1, wherein the first automated determination that the first portion of the data will comprise personal information is based on detecting one or more secure communication protocols.

10. The computer-implemented method of claim 1, further comprising, when the first portion of the data comprises sensitive personal information comprising password information:
   storing, in a keyring file, the password information entered via the virtual system keyboard; and
   subsequently requesting the password information from the keyring file without requiring entry of password information via the virtual system keyboard or the virtual third-party keyboard.

11. A computing device comprising a processor and memory storing instructions executable by the processor to perform operations comprising:
   making a first automated determination that a first portion of data to be entered at the computing device will comprise sensitive personal information;
   based on the first automated determination that the first portion of the data to be entered will comprise sensitive personal information, disabling a virtual third-party keyboard and instead providing a virtual system keyboard for entry of the first portion of the data, wherein the virtual system keyboard is native to the computing device;
   making a second automated determination that a second portion of the data to be entered will not comprise sensitive personal information;
   receiving a user-communicated indication to provide the virtual system keyboard for entry of the second portion of the data, wherein the user-communicated indication overrides the second automated determination that the second portion of the data to be entered will not comprise sensitive personal information; and
   disabling the virtual third-party keyboard and instead providing the virtual system keyboard for entry of the second portion of the data after receiving the user-communicated indication.

12. The computing device of claim 11, the operations further comprising:
   storing, for application content, information representative of the user-communicated indication to provide the virtual system keyboard for entry of the second portion of the data that overrides the second automated determination; and
   when the application content is next received, determining whether entry of data comprises sensitive personal information based on the stored information representative of the user-communicated indication to provide the virtual system keyboard for entry of the second portion of the data.

13. The computing device of claim 11, wherein the virtual system keyboard is installed by a manufacturer of the computing device, and wherein the virtual third-party keyboard is provided by a third party different from the manufacturer.

14. The computing device of claim 11, wherein the virtual third-party keyboard is associated with application content, and wherein the virtual system keyboard is not associated with the application content.

15. A non-transitory computer readable medium storing instructions executable by a computing device to perform operations comprising:
   making a first automated determination that a first portion of data to be entered at the computing device will comprise sensitive personal information;
   based on the first automated determination that the first portion of the data to be entered will comprise sensitive personal information, disabling a virtual third-party keyboard and instead providing a virtual system keyboard for entry of the first portion of the data, wherein the virtual system keyboard is native to the computing device;
   making a second automated determination that a second portion of the data to be entered will not comprise sensitive personal information;
   receiving a user-communicated indication to provide the virtual system keyboard for entry of the second portion of the data, wherein the user-communicated indication overrides the second automated determination that the second portion of the data to be entered will not comprise sensitive personal information; and
   disabling the virtual third-party keyboard and instead providing the virtual system keyboard for entry of the second portion of the data after receiving the user-communicated indication.

16. The non-transitory computer readable medium of claim 15, the operations further comprising:
   storing, for application content, information representative of the user-communicated indication to provide the virtual system keyboard for entry of the second portion of the data that overrides the second automated determination; and
   when the application content is next received, determining whether entry of data comprises sensitive personal information based on the stored information representative of the user-communicated indication to provide the virtual system keyboard for entry of the second portion of the data.

17. The non-transitory computer readable medium of claim 15, wherein the first automated determination that the first portion of the data will comprise sensitive personal information is based on a keyword in application content, wherein the keyword is associated with the sensitive personal information.

18. The non-transitory computer readable medium of claim 15, wherein the first automated determination that the first portion of the data will comprise sensitive personal information is based on an image in application content, wherein the image is associated with the sensitive personal information.

19. The non-transitory computer readable medium of claim 15, wherein the first automated determination that the first portion of the data will comprise personal information is based on previously stored keyboard information associated with application content.

20. The non-transitory computer readable medium of claim 15, wherein the first automated determination that the first portion of the data will comprise personal information is based on detecting one or more secure communication protocols.

* * * * *